United States Patent [19]

Randall

[11] 3,923,484
[45] Dec. 2, 1975

[54] FLAME METHOD OF PRODUCING GLASS
[75] Inventor: Eric N. Randall, Bath, N.Y.
[73] Assignee: Corning Glass Works, Corning, N.Y.
[22] Filed: Jan. 11, 1974
[21] Appl. No.: 432,572

[52] U.S. Cl. .............................. 65/18; 65/3; 65/21; 65/60; 65/120; 65/DIG. 7; 427/422; 427/423
[51] Int. Cl.² ................ C03B 23/20; C03B 25/00; C23C 11/00
[58] Field of Search ............... 65/18, 21, DIG. 7, 33, 65/120, DIG. 16, 60 D, 3; 117/46 FS, 106 R, 105.2; 427/423, 422

[56] References Cited
UNITED STATES PATENTS
3,826,560 7/1974 Schultz .............................. 65/120 X Primary Examiner—S. Leon Bashore
Assistant Examiner—Frank W. Miga
Attorney, Agent, or Firm—Milton M. Peterson; Clinton S. Janes, Jr.; Clarence R. Patty, Jr.

[57] ABSTRACT

A method of producing a glass body composed of two or more oxides by the flame hydrolysis technique, for example incorporating an additive or dopant oxide in a fused silica glass body. The method comprises forming a gas stream containing vapors of a compound that will hydrolyze to a glass forming oxide, e.g. silicon tetrachloride ($SiCl_4$), entraining an oxide, or material convertible thereto, in the form of solid particles not over about one micron in size, and simultaneously passing the vapors and particles into a flame of combustible gas to form and codeposit an oxide mixture.

4 Claims, 1 Drawing Figure

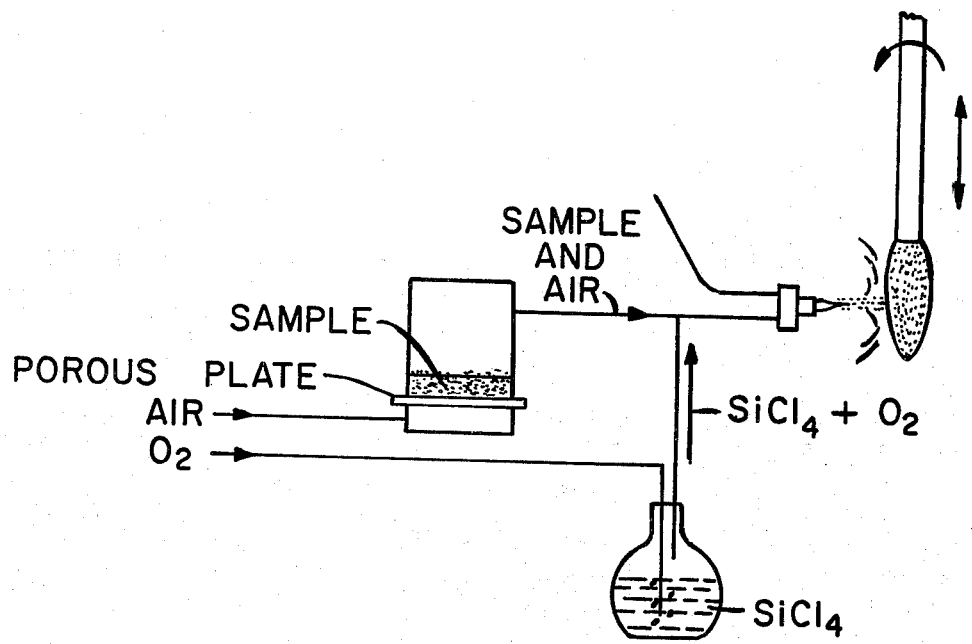

FLAME METHOD OF PRODUCING GLASS

The invention relates to a method of producing a glass body, such as a fused silica type glass body, by flame hydrolysis. It is especially concerned with a unique method of producing such a glass body composed of two or more oxides.

United States Patent No. 2,272,342, granted Feb. 10, 1942 to J. F. Hyde, describes the flame hydrolysis technique of producing glass with reference to the production of pure fused silica, that is a glass composed entirely of silica ($SiO_2$). As described by Hyde, a stream of gas carrying a hydrolyzable compound of silicon in vapor form is introduced into a flame of combustible gas. The compound of silicon is hydrolyzed in the flame to form amorphous silica which may be collected in particulate form, or may be deposited on a mandrel or other support as a preform. The preform may be vitrified in position, or may be consolidated and vitrified by a separate heat treatment.

Subsequent patents, including U.S. Pat. No. 2,326,059 granted Aug. 3, 1943 to M. E. Nordberg, and U.S. Pat. No. 2,239,551 granted Apr. 22, 1941 to R. H. Dalton et al., describe methods of producing glasses by flame hydrolysis wherein the glass is composed of an oxide mixture, in particular a fused silica type glass incorporating small amounts of one or more additional oxides such as titania or alumina. In general, these methods involve forming a mixture of volatile compounds in the desired proportions in a stream of gas fed to a combustion burner. The mixture of vapors is then hydrolyzed to deposit a glass or preform containing a corresponding oxide mixture.

The mixed oxide glasses that can be produced by these earlier methods are limited by the ability to obtain materials that are relatively volatile and that may be hydrolyzed to form an oxide in accordance with the flame hydrolysis technique. Even when suitable volatile compounds are available, it may be difficult to control vapor evolution.

A copending application, Ser. No. 208,168 filed Dec. 15, 1971 in the names of P. C. Schultz and F. W. Voorhees, now Pat. No. 3,801,294, describes a modified vapor generating procedure wherein a carrier gas is passed through a heated fluidized bed or layer of a particulate material to entrain vapors of the material. My application, Ser. No. 432,573, filed of even date herewith and also entitled "Method of Producing Glass," now U.S. Pat. No. 3,883,336, issued May 13, 1975 discloses a method wherein a liquid metal compound, or solution of such compound, is nebulized to form an aerosol, and oxide particles formed therefrom are codeposited with an oxide produced from a hydrolyzed vapor. Likewise, copending application, Ser. No. 407,918 filed Oct. 19, 1973 in the name of P. C. Schultz and entitled "Method of Producing Glass by Flame Hydrolysis," now Pat. No. 3,859,073 issued Jan. 1, 1975 discloses a method wherein a porous preform, of the nature described by Hyde, is impregnated in part at least to introduce a desired oxide.

U.S. Pat. No. 3,698,936, granted Oct. 17, 1972 in the name of H. J. Moltzan, discloses a method of producing a high purity, metal oxide article by entraining metal particles in gas stream, combining this stream with a stream carrying corresponding metal halide vapors and directing the combined streams into a combustion flame to oxidize the metal and deposit metal oxide particles. The patent specifically discloses oxidation of silicon particles. While it suggests that various other metals and metal halides, including combinations of different metals, may be used to produce metal oxide articles, there is no specific description of the procedure, or recognition of any problem to overcome.

I have found that, contrary to expectation, a serious problem does arise when one endeavors to adopt the solid particle technique of Moltzan to glass production. In particular, difficulty arises in producing a clear, transparent glass body free from visual inclusions or defects. This problem arises regardless of whether the oxide particles are deposited in a sufficiently hot environment to form a glassy boule on deposition, or whether a porous preform is formed and subsequently consolidated to a nonporous glassy body. The present invention provides a solution to this problem.

The invention provides a versatile and convenient method of producing high purity glasses composed of a mixture of oxides. It further provides a convenient means of introducing additive oxides into fused oxide type glasses produced by flame hydrolysis and greatly broadens the range of components that can be incorporated in such glasses. The invention is based on my discovery of a method whereby the flame hydrolysis procedure can be applied to a mixture of hydrolyzable vapors and solid oxide particles, or particles convertible to the oxide, to produce a clear, transparent, mixed oxide glass directly or by subsequent thermal consolidation.

The invention is a method of producing a glass body composed of two or more constituent oxides comprising forming a gas stream containing vapors of at least one compound that will hydrolyze to a glass forming oxide in a combustion flame, entraining an oxide, or material convertible to such oxide, in the form of solid particles that do not exceed about one micron in size, and simultaneously passing the vapors and particles into the flame of a combustion burner to form and codeposit an oxide mixture. The invention further contemplates an improved method of doping a fused oxide glass, such as a fused silica glass produced by flame hydrolysis, with a second oxide wherein said second oxide is entrained in a gas stream in the form of solid particles and codeposited from a combustion flame.

The invention is of particular interest in, and hence is described in detail with respect to, the production of modified or doped fused silica type glass bodies. However, it will be understood that the invention is not limited to this type of glass, but may be employed as well in the production of glasses based on other glass forming oxides. For example, a germanium oxide ($GeO_2$) type glass body may be produced by mixing vapors of germanium chloride ($GeCl_4$) with a suitable oxide, or convertible material, in solid particulate form. It will also be apparent that other types of fused oxide glasses, such as $B_2O_3$, $P_2O_5$ and $SeO_2$ glasses, may be produced by suitable selection of materials.

In practicing the invention, a gas stream is provided containing the vapors of at least one material that will hydrolyze to form an oxide in the flame of a combustion burner. The vaporizable material may be any of the metal halides, metal organics, or other compounds that are suitable for the conventional flame hydrolysis process of glass production. The selected material may be volatilized in conventional manner, for example by heating a water bath and/or entrainment by a carrier gas. Alternative procedures involving generation of vapors from a heated fluidized bed are described in copending application Ser. No. 208,168 mentioned earlier.

The gas stream thus produced may then be combined with fine particles of a selected oxide, or material thermally convertible to such oxide, to form a gas stream containing such particles entrained therein. This combintion may be effected by passing the vapor-containing gas stream through a bed of the fine particulate material. For example, a stream of dry carrier gas, such as oxygen, may be passed through a container of vaporizable liquid, for example $SiCl_4$, to entrain vapors of the chloride. The vapor entraining stream thus formed may then be passed through a bed or layer of finely divided oxide particles, for example titania particles. It will be understood that a material convertible to the oxide might be used instead of the oxide. For example, finely divided titanium metal, which may be oxidized, or a titanium compound which will thermally decompose to the oxide may be substituted.

The corrosive nature of materials such as liquid chlorides frequently makes the above practice undesirable. Alternatively then, two carrier gas streams may be provided. These may be the same gas, or different gases, as desired. One gas stream is passed through the vaporizable liquid ($SiCl_4$) while the other passes through the particulate oxide, or convertible material, and entrains a controlled amount of the particles. The two streams are then combined to form a single stream to be passed into a combustion burner flame.

A further alternative involves placing the particulate oxide in a vibrator designed to feed a limited amount of particulate material into a gas stream directed along one edge thereof. This practice is susceptible to closer compositional control in the ultimate particle-vapor mixture.

The gas stream containing a mixture of vapors and particles is then passed into the flame of a combustion burner in accordance with conventional flame hydrolysis practice. The vapors in the stream hydrolyze to form the corresponding oxide; for example, $SiCl_4$ hydrolyzes to form $SiO_2$.

The invention has thus far been described in terms of forming a combined gas stream containing vapors and solid particles. It will be understood, however, that the vapor and solid particle streams may be maintained separate and introduced separately, although simultaneously, into the flame. Normally, the turbulence in the flame is sufficient to provide complete mixing, and hence homogeneous codeposition, of the oxides formed.

The present invention is based on two discoveries regarding the behavior of solid particles when they are introduced into the conventional flame hydrolysis procedure. First, oxide particles, whether entrained in the gas stream as such or formed from corresponding metal or compound particles entrained therein, combine in a uniform and homogeneous manner with the oxide particles produced by flame hydrolysis. Furthermore, the resulting oxide mixture will thermally consolidate to a clear glass, that is, a glass free from visible inclusions or inhomogeneities, providing the particle size of the entrained particles is sufficiently small. In general, the particles should not be over one micron in size and a maximum size of one-half micron is preferred. Otherwise, the oxide additive, such as titania, does not fully combine with the glass former, such as silica, and tends to form inclusions or inhomogeneities in the resulting glass.

The oxide particles formed may be vitrified and deposited as a glass boule in accordance with conventional manufacturing practice. Alternatively, they may be deposited, at a somewhat lower temperature, as a porous preform on a suitable support or mandrel. Compositional control of the oxide mixture produced is achieved by controlling the flow rates of the two gas streams, and thereby the relative proportions of the vapor material and solid material in the mixed stream. The amount of solid particles entrained depends primarily on particle size and gas flow rate. However, the depth of particle size and other structural parameters have some influence. A relationship of particle pickup to gas flow can be readily established for any material and set of operating conditions.

If the oxide mixture is deposited in a dense sintered form, commonly referred to as a preform, this preform may be vitrified by a subsequent heat treatment which consolidates the porous body into a non-porous vitreous body. This consolidating heat treatment may be an overall heating of the preform body as disclosed in the patents mentioned above. Alternatively, the heat treating process described in Applicatoin Ser. No. 239,742, entitled "Method and Apparatus for Producing High Quality Fused Silica" and filed Mar. 30, 1972 in the names of J. S. Flamenbaum et al., now U.S. Pat. No. 3,806,570 may be employed. In accordance with the latter procedure, the preform is subjected to a progressive heat treatment by slowing passing it into or through a thermal zone wherein vitrification takes place. This process has the advantage of minimizing gas inclusions in the body of the consolidated glass.

The method provides a convenient means of producing a fused oxide type glass of virtually any desired composition. Thus, almost any desired oxide can be produced in solid particular form either as the oxide or as a compound that converts to the oxide by heat treatment. For example, solid metals, metal oxides, metal halides, metal hydroxides, organometallics, are among the various types of materials that may be used as starting materials. Where a metal or metal halide is employed, the material must be capable of conversion to the oxide in the flame. Likewise, a carbonate, nitrate or hydroxide must be capable of decomposition to the oxide in the flame.

The invention is further described with particular reference to the preferred embodiment (fused silica glasses) and to the accompanying drawing wherein the single FIGURE is a schematic illustration of a simple apparatus for practice of the invention.

The drawing shows a stream of carrier gas (oxygen) being introduced from an external source (not shown) into a flask of silicon chloride ($SiCl_4$) to produce a stream of gas containing entrained silicon chloride vapors. Thus far this illustrates conventional practice as described in the Hyde patent mentioned earlier. Any suitably volatile silicon compound, such as any of the halides, a silane, or a halogen derivative thereof, might be substituted in the flask to provide vapors in the carrier gas stream. The chloride is particularly suitable because it is readily volatilized by passing a suitable carrier gas, such as oxygen, through a container thereof. If desired, the chloride, or other liquid may be heated in a water bath for faster evolution of vapors.

As shown, a second carrier gas (air) is simultaneously passed into an open space in the base of a closed container within which a layer or bed of finely divided, particular material (sample) is supported on a suitable support such as a porous nickel plate. The material forming the bed or layer in the container is selected, as indicated earlier, to provide the desired additive or second oxide for the glass body being produced. The carrier gas, introduced under slight pressure, passes upwardly through the porous support and through the bed or layer of finely divided material to entrain the latter in the nature of a dust as it passes through. The carrier gas stream, containing the dust or fine particles and designated "sample + air," is intermingled with the stream containing vapors of $SiCl_4$ at the junction of two conducting lines leading to a combustion burner. The resulting combination stream is then passed through a combustion burner into a flame of combustible gas where the $SiCl_4$ vapors are converted into silica and a mixture of silica and additive oxide particles is formed. In the embodiment illustrated, this mixture of particles is deposited as a porous body on the surface of a mandrel carried by a handle which is mounted, as shown by arrows, for both translatory and rotational movement.

The preform thus produced may then be consolidated to a clear glass body as earlier described. It may be noted that the fluid bed feed mechanism shown in the drawing might be replaced by a vibrating or other known feed mechanism to produce a stream of gas entrained, solid particles. Likewise, while the vapor and particle streams are shown being passed through the combustion burner as a single stream, the particle stream could be directly introduced into the flame separately.

The following example illustrates practice of the invention with respect to a specific embodiment thereof.

An apparatus was set up essentially corresponding to that shown in the drawing. The outlet material lines were connected by a T-fitting intermediate the material containers and the combustion burner. The gas/solid fluidized bed was provided with a layer of finely divided (minus 325 mesh) cobalt metal powder to a depth of about ¾ inch on the porous nickel plate support member. A flow of oxygen was bubbled through the $SiCl_4$ liquid at a rate of 2800 c.c./min. with the liquid container maintained at a constant temperature of 25°C. Meanwhile, a stream of air was passed into and through the fluidized bed at a rate of 11,000 c.c./min. and the two streams intermingled before being conveyed to the combustion burner. The burner flame was maintained by a mixture of natural gas at a flow rate of 0.4 cubic feet/minute and oxygen at a flow rate of 0.35 cubic feet/minute. The $SiCl_4$ vapors hydrolyzed within the flame to form $SiO_2$ particles, commonly referred to as soot, while the cobalt metal particles oxidized to form a cobalt oxide (CoO). The resulting oxide mixture was deposited on the surface of a 9 inches long fused quartz tube having an outer diameter of 5 mm. This mandrel or support member was attached to a ¾ inch outer diameter fused quartz handle which in turn was mounted in a device adapted to rotate at 180 rpm while translating back and forth at a rate of 16 inches/min. The mandrel was mounted a distance of 7 inches from the flame and a porous preform was developed on the mandrel during a period of several hours operation. This preform was then thermally consolidated to the vitreous state by progressively introducing the preform into and through the hot zone (1450°C.) of a helium atmosphere induction furnace at a relatively slow rate of 15 inches/hour. The resulting glass body was clear, transparent and had the characteristic blue coloration of cobalt containing glasses. Analysis indicated a uniform distribution of 0.013 weight percent CoO throughout the glass with the remainder being silica.

Similar glass forming operations were carried out in which $Co_2O_3$ was employed as the powdered additive in the fluidized bed. This oxide was then entrained by the carrier gas stream and mixed with the $SiCl_4$ stream in a manner described above. By varying the relative flow rates in the streams, porous bodies were produced in which the cobalt oxide content varied from approximately one part per million up to approximately 1 percent by weight. The latter body was outside the glass forming region in the $SiO_2$-CoO binary system by normal thermal consolidation procedures.

A further test run was conducted using production equipment essentially corresponding to that of the preceding example, except that a fritted, porous glass disc was employed instead of a porous metal plate as a support for the finely divided material (sample). Finely divided alumina ($Al_2O_3$) powder was placed on the fritted disc to a depth of about 1 inch. A baffle was inserted in the container above the powder to prevent passage of particles over one micron in size.

A stream of dry nitrogen was passed through the alumina powder at a rate of 7500 cc/min. to entrain fine particles of the oxide. Meanwhile, oxygen was passed into a container of $SiCl_4$ at a rate of 3500 cc/min. with the $SiCl_4$ at a temperature of 25°C. The resultant stream of entrained alumina particles and stream of entrained $SiCl_4$ vapors were mixed and passed through a combustion burner into the flame thereof. The burner flame was fueled by a mixture of natural gas and oxygen, both at 0.35 cfm. In the flame, the $SiCl_4$ hydrolyzed to form silica which intermingled with the alumina particles and deposited on a bait (mandrel) as a homogeneous mixture.

The mandrel was a fused quartz tube as described above and was mounted in similar manner for combined translation and rotation. The mandrel was spaced seven inches from the burner and a porous preform was gradually built up as the mandrel was translated and rotated as before. The preform thus produced was thermally consolidated to the vitreous state by progressively introducing the preform into and through the hot zone (1450°C.) of a helium atmosphere induction furnace at a relatively slow rate. The resulting glass body was clear and transparent. Analysis showed 35.2 weight percent $Al_2O_3$ in the glass with the remainder silica.

An identical run was made with all materials and parameters being held constant except that the flow of dry nitrogen through the fritted glass into the alumina powder was reduced to 3500 cc/min. This produced a clear, transparent glass containing 1.0 weight percent $Al_2O_3$ and the remainder silica.

In another test run carried out under similar conditions, finely divided lanthana ($La_2O_3$) particles were combined with silicon tetrachloride vapors to form and codeposit a mixture of oxide particles containing 0.6 percent $La_2O_3$ and the remainder silica. The preform thus formed was consolidated to form a clear, colorless glass free from visible inclusions.

I claim:

1. A method for making a transparent, homogeneous glass body consisting of at least two constituent oxides comprising the steps:
   a. entraining within a gas stream vapors of a compound of $SiO_2$, $GeO_2$, $B_2O_3$, $P_2O_5$, $SeO_2$, and mixtures thereof that will hydrolyze in a flame to produce the corresponding glass forming oxides in particulate form;
   b. entraining within a gas stream finely divided solid particles that do not exceed about one micron in size of a metal oxide additive, or a metal or metal compound convertible thereto by heat treatment in a flame; and
   c. combining said gas stream containing the said vapors and said gas stream containing the said finely divided solid particles and then passing the combined gas stream into the flame of a combustion burner to form and codeposit a homogeneous oxide mixture as a glass body free from visual inclusions of inhomogeneities.

2. A method in accordance with claim 1 wherein said compound of $SiO_2$ that will hydrolyze in a flame is silicon tetrachloride ($SiCl_4$) and said finely divided particles are of a cobalt oxide or a cobalt compound convertible thereto by heat treatment in a flame.

3. A method for making a transparent, homogeneous glass body consisting of at least two constituent oxides comprising the steps: particulate
   a. entraining within a gas stream vapors of a compound of $SiO_2$, $GeO_2$, $B_2O_3$, $P_2O_5$, $SeO_2$, and mixtures thereof that will hydrolyze in a flame to produce the corresponding glass forming oxide in particulate form;
   b. entraining within a gas stream finely divided solid particles that do not exceed about one micron in size of a metal oxide additive, or a metal or metal compound convertible thereto by heat treatment in a flame;
   c. combining said gas stream containing the said vapors and said gas stream containing the said finely divided solid particles and then passing the combined gas stream into the flame of a combustion burner to form and codeposit a homogeneous oxide mixture as a porous preform; and then
   d. consolidating said porous preform into a nonporous glass body free from visual inclusions or inhomogeneities by heat treatment thereof.

4. A method in accordance with claim 3 wherein said compound of $SiO_2$ that will hydrolyze in a flame is silicon tetrachloride ($SiCl_4$) and said finely divided particles are of a cobalt oxide or a cobalt compound convertible thereto by heat treatment in a flame.

* * * * *

UNITED STATES PATENT OFFICE
CERTIFICATE OF CORRECTION

PATENT NO. : 3,923,484
DATED : December 2, 1975
INVENTOR(S) : Eric N. Randall

It is certified that error appears in the above-identified patent and that said Letters Patent are hereby corrected as shown below:

Column 4, line 39, "particular" should be -- particulate --.

Column 5, line 54, "Sio$_2$" should be -- SiO$_2$ --.

Column 7, line 20, Claim 1, "of" should be -- or --.

Column 8, line 1, Claim 3, after "steps:", delete "particulate".

Signed and Sealed this eleventh Day of May 1976

[SEAL]

Attest:

RUTH C. MASON
*Attesting Officer*

C. MARSHALL DANN
*Commissioner of Patents and Trademarks*